United States Patent [19]

Arai

[11] Patent Number: 5,475,458
[45] Date of Patent: Dec. 12, 1995

[54] ALBADA FINDER

[75] Inventor: Akihiro Arai, Tokyo, Japan

[73] Assignee: Asahi Kogaku Kogyo Kabushiki Kaisha, Tokyo, Japan

[21] Appl. No.: 331,796

[22] Filed: Oct. 31, 1994

[30] Foreign Application Priority Data

Nov. 2, 1993 [JP] Japan ................. 5-063646 U

[51] Int. Cl.[6] .................................................. G03B 13/02
[52] U.S. Cl. .................... 354/219; 354/224; 354/225
[58] Field of Search ............................ 354/219, 224, 354/225

[56] References Cited

U.S. PATENT DOCUMENTS

| | | |
|---|---|---|
| 1,678,493 | 7/1928 | Van Albada . |
| 2,217,930 | 10/1940 | Zimmermann . |
| 2,487,773 | 11/1949 | Schwartz et al. . |
| 3,041,919 | 7/1962 | Baur et al. . |
| 3,149,547 | 9/1964 | Jurenz . |
| 3,575,082 | 4/1971 | McClune . |
| 5,218,393 | 6/1993 | Nakamura et al. . |
| 5,218,396 | 6/1993 | Morisawa . |
| 5,309,201 | 5/1994 | Lyon . |

*Primary Examiner*—Monroe H. Hayes
*Attorney, Agent, or Firm*—Sandler, Greenblum, & Bernstein

[57] ABSTRACT

An Albada finder has a negative objective lens and a positive eyepiece lens. A frame is formed inside the area of the object-side surface of the positive eyepiece lens and a partial reflection area is formed on the eyepiece-side surface of the negative objective lens. The partial reflection area reflects an image of the frame. The frame is formed to enclose a small area of the object-side surface of the eyepiece lens while the partial reflection area is formed to enclose a small area of the eyepiece-side surface of the objective lens. Substantially all of the remaining area of the eyepiece-side surface of the negative objective lens not enclosed by the partial reflection area fully transmits all light incident on the surface.

19 Claims, 8 Drawing Sheets

ALBADA FINDER

BACKGROUND OF THE INVENTION

The present invention relates to an Albada finder that is commonly used in a compact camera.

Figure 8:
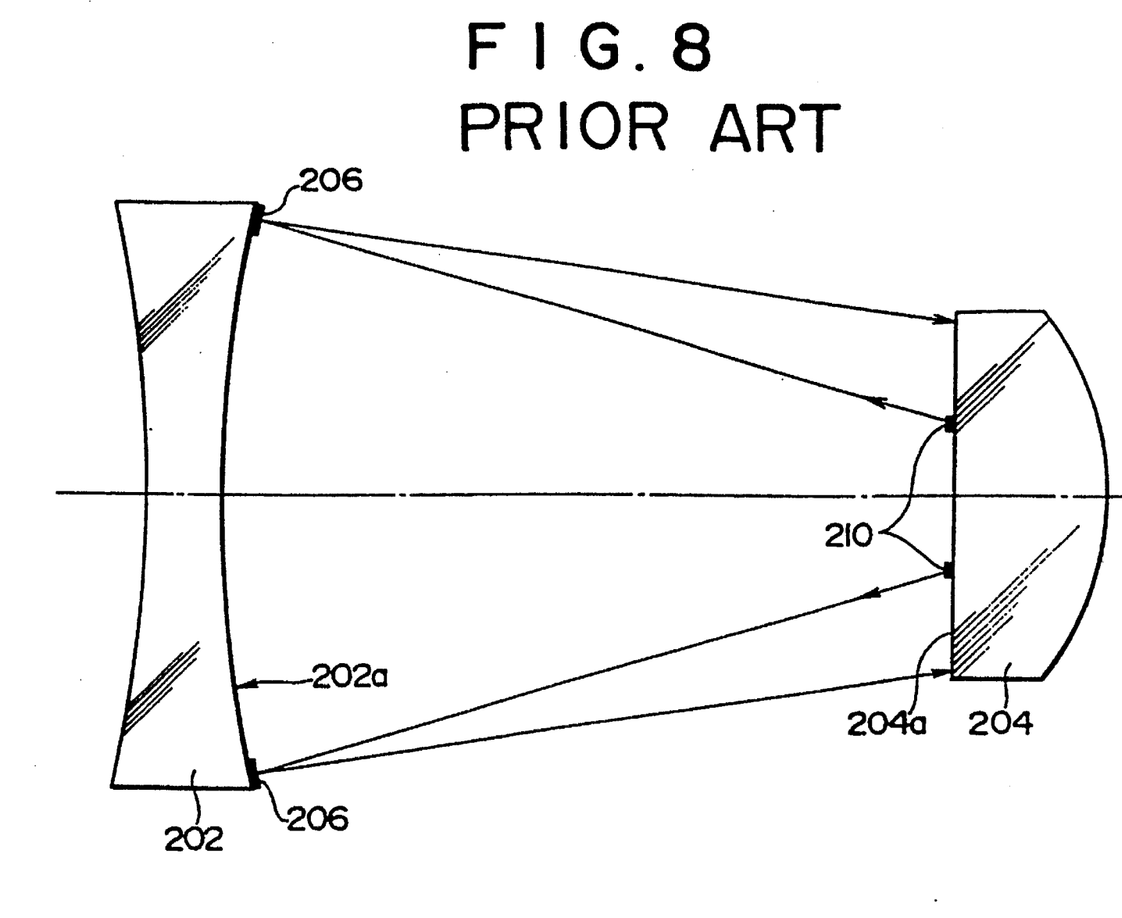
FIG. 8 shows a lens system of a conventional Albada finder system.

As shown in FIG. 8, a conventional Albada finder is provided with a negative objective lens 202 and a positive eyepiece lens 204. An image boundary frame 210 indicates an area of an object to be photographed, that will be exposed on a frame of film in the camera. The image boundary frame 210 is formed on the object-side surface 204a of the positive eyepiece lens 204. An image of the frame 210 is reflected by a total reflection portion 206 that is formed on a peripheral area of the eyepiece-side surface 202a of the negative objective lens 202.

A finder of an auto-focus camera requires a focusing frame to indicate a detecting area of an auto-focus device. The focusing frame is also formed on the object-side surface 204a of the eyepiece lens 204. However, the entire area of the eyepiece-side surface 202a of the objective lens 202, enclosed by the total reflection portion 206, is formed as a half-mirror in order to allow light to pass through from the object to the eyepiece lens 204, and to reflect the image of the focusing frame back to the eyepiece lens 204.

Since the entire eyepiece-side surface of the above-mentioned conventional Albada finder is a half-mirror, the intensity of the light transmitted therethrough is reduced by one half. This results in the image of the object viewed in the finder becoming dark, making it difficult to see.

SUMMARY OF THE INVENTION

It is therefore an object of the present invention to provide an Albada finder having a bright field of view, and which allows a focusing frame to be superimposed on the image of an object viewed in the finder.

According to one aspect of the present invention, an Albada finder is provided having a negative objective lens and a positive eyepiece lens. The Albada finder includes:

a frame formed inside an area of an object-side surface of the positive eyepiece lens; and a partial reflection area formed on the eyepiece-side surface of the negative objective lens, the partial reflection area reflecting an image of the frame.

The frame is formed to enclose a small area of the object-side surface of the eyepiece lens, and the partial reflection area is formed to enclose a small area of the eyepiece-side surface of the objective lens.

Substantially all of a remaining area of the eyepiece-side surface of the negative objective lens not enclosed by the partial reflection area fully transmits all light incident thereon.

According to another aspect of the present invention, an Albada finder has a negative objective lens, a positive eyepiece lens, an image boundary frame formed on an object-side surface of the eyepiece lens, and a total reflection area formed on an eyepiece-side surface of the objective lens for reflecting an image of the image boundary frame back to the eyepiece. The Albada finder further includes a focusing frame formed inside an area of the object-side surface of the positive eyepiece lens enclosed by the image boundary frame; and a partial reflection area formed inside an area of the eyepiece-side surface of the negative objective lens enclosed by the total reflection area, the partial reflection area reflecting an image of the focusing frame.

An area of the eyepiece-side surface of the negative objective lens between the total reflection area and the partial reflection area fully transmits all light incident thereon.

DESCRIPTION OF THE EMBODIMENTS

The present invention will now be described hereinafter with reference to the drawings.

Figure 1:
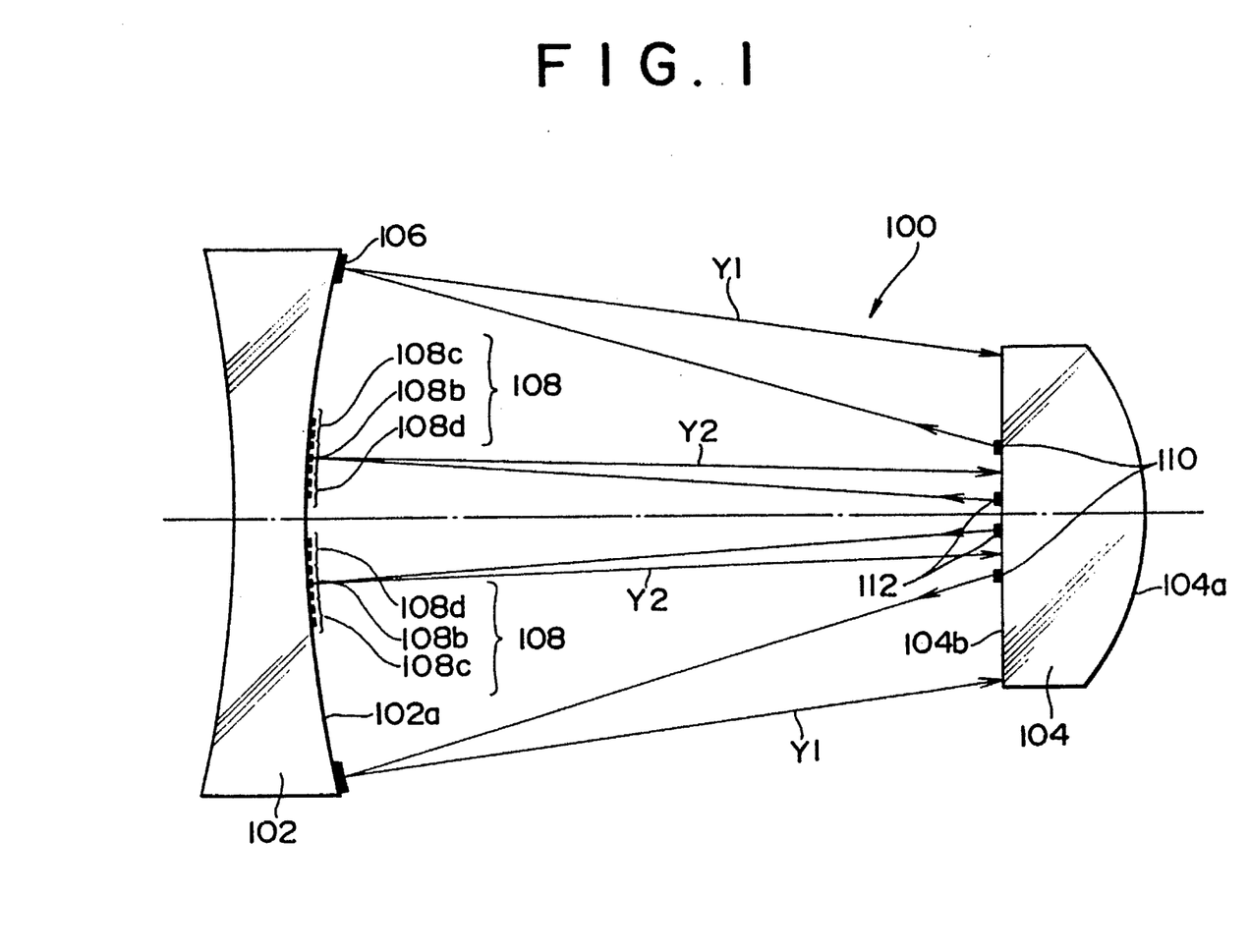
FIG. 1 shows a lens system of an Albada finder of one embodiment of the present invention.

FIG. 1 shows a first embodiment of an Albada finder 100 according to the present invention. The Albada finder 100 comprises a negative objective lens 102 and a positive eyepiece lens 104. The negative objective lens 102 is a double concave lens and the positive eyepiece lens 104 is formed as a plano-convex lens.

Figure 2:
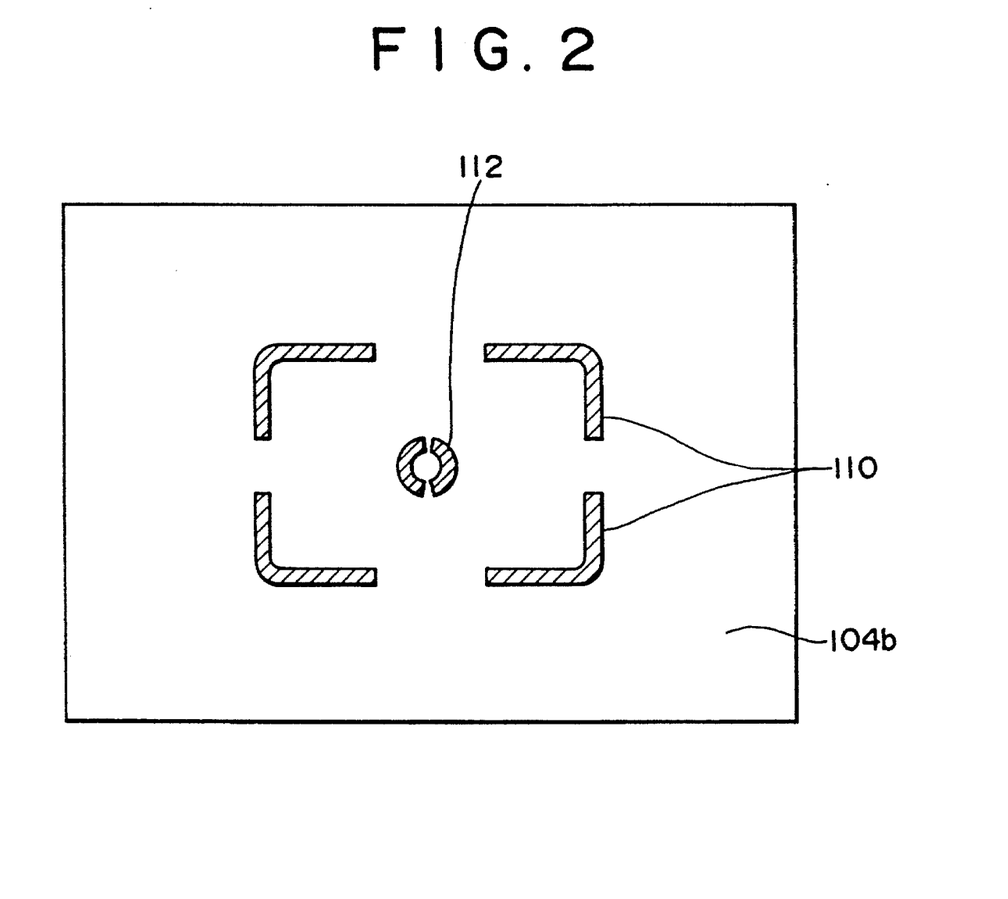
FIG. 2 is a plane view of an object-side surface of a positive eyepiece lens of FIG. 1.

An image boundary frame 110 is formed on an objective-side surface 104b of the positive eyepiece lens 104 as shown in FIG. 2. A viewing area enclosed by the frame 110 represents a portion of an object that will be exposed on a film in the camera. A focusing frame 112 is formed in a central portion of the objective-side surface 104b enclosed by the image boundary frame 110. The focusing frame 112 indicates an area of the object to be photographed which is used by an auto-focus device to perform an autofocusing operation. These frames 110 and 112 are formed of a high reflectivity material, such as aluminum, using a vacuum evaporation process.

Figure 3:
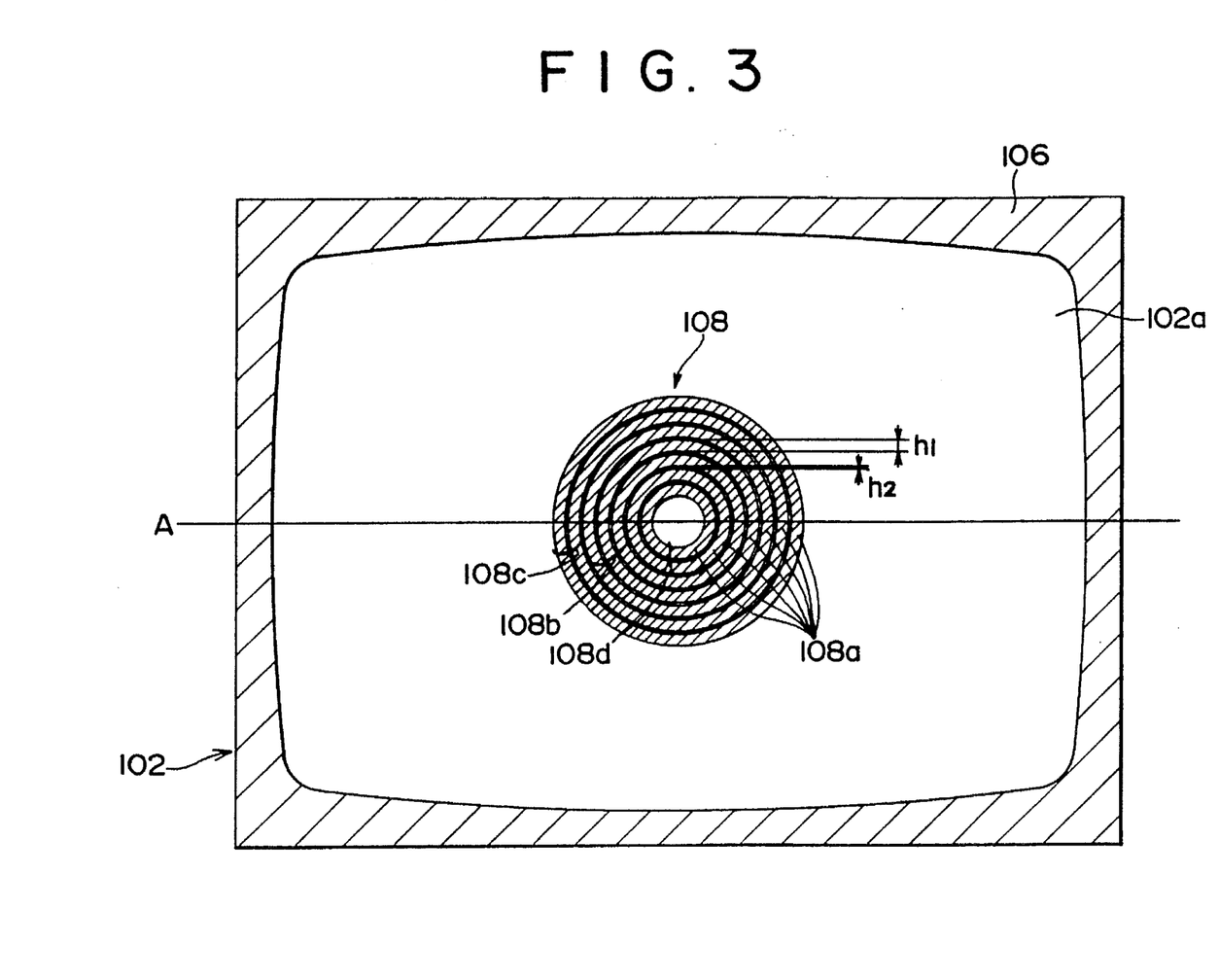
FIG. 3 is a plane view of an eyepiece-side surface of a negative objective lens of FIG. 1.

A total reflection area 106 is formed on a peripheral portion of an eyepiece-side surface 102a of the negative objective lens 102, as shown in FIG. 3, to reflect an image of the image boundary frame 110. A partial reflection area 108 is formed on a central portion of the eyepiece-side surface 102a to reflect an image of the focusing frame 112. An intermediate area between the total reflection area 106 and the partially reflection area 108 of the eyepiece-side surface 102a is a total transmission area. The total reflection area 106 is formed of a high reflectivity material such as aluminum.

The partial reflection area 108 comprises a plurality of ring mirrors 108a, that are concentrically arranged and separated from each other. Each ring mirror 108a has a different diameter, and is formed of a high reflectivity material to reflect all of the light incident thereon. Thus, each ring mirror 108a is a total reflection mirror. The spaces between the ring mirrors 108a transmit all the light incident thereon.

FIG. 3 shows the eyepiece-side surface 102a of the objective lens, in more detail. However, in the actual embodiment, there is a larger number of the ring mirrors 108a than is shown in FIG. 3. Further, the width of each ring mirror 108a and the space between each ring mirror 108a are much narrower than shown in FIG. 3.

The macroscopic reflectivity of the partial reflection area 108 is determined by the density of the mirrors in the partial reflection portion 108. This can be determined from the ratio of a width $h_1$ of the ring mirror 108a to a width $h_2$ of the space.

Figure 4:
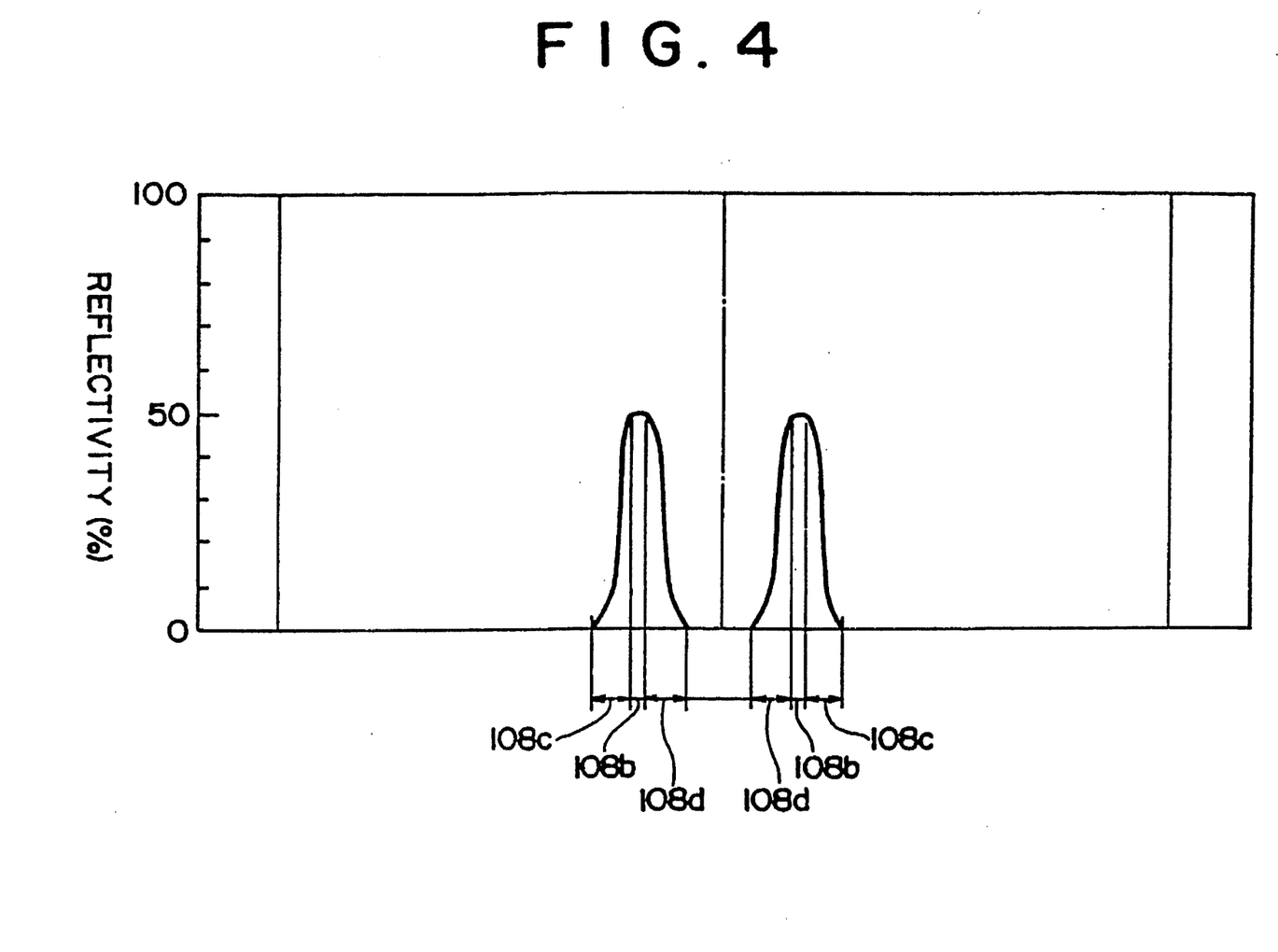
FIG. 4 is a graph showing reflectivity of the eyepiece-side surface of the negative objective lens shown in FIG. 3.

The partial reflection area 108 can be divided into three portions 108b, 108c and 108d. FIG. 4 shows the macroscopic reflectivity distribution of the partial reflection area 108 along a line A, shown in FIG. 3. A vertical axis of FIG. 4 indicates macroscopic reflectivity and a horizontal axis indicates position on the eyepiece-side surface 102a along the line A.

The width $h_2$ of the space between a pair of the ring mirrors 108a is the same for all spaces between each pair of the ring mirrors 108a, in each portion 108b, 108c and 108d. In this embodiment, the macroscopic reflectivity is set by changing the width $h_1$ of the ring mirrors 108a, for each portion 108b, 108c and 108d.

The width $h_1$ of the ring mirrors 108a is equal to a width $h_2$ of the space in the intermediate portion 108b, and therefore, the macroscopic reflectivity of the portion 108b is 50%.

The width $h_1$ of the ring mirrors 108a in the outer portion 108c gradually decreases in a direction away from the center of the surface 102a. Similarly, the width $h_1$ of the ring mirrors 108a in the inner portion 108d gradually decreases in a direction towards the center of the surface 102a. As a result, the macroscopic reflectivity of the outer portion 108c gradually reduces from 50% to 0% towards the periphery of the surface 102a. Similarly, the reflectivity of the inner portion 108d gradually reduces from 50% to 0% towards the center of the surface 102a. This macroscopic reflectivity characteristic is shown in FIG. 4.

The image of the focusing frame 112 can be reflected by the intermediate portion 108b alone. However, if the other portions 108c and 108d are not formed adjacent to the intermediate portion 108b, the reflectivity gradient changes sharply, resulting in an unwanted contrast gradient being introduced into the image that is viewed by the user.

Light from the object is incident on the negative objective lens 102 which then forms a virtual image of the object. The image can then be observed by the user through the positive eyepiece lens 104.

Further, light reflected by the image boundary frame 110 is reflected by the total reflection area 106 back to the eyepiece lens 104, and shown as ray Y1 in FIG. 1. Similarly, approximately half the light reflected by the focusing frame 112 is reflected by the partial reflection area 108 back to the eyepiece lens 104 and shown as ray Y2 in FIG. 1. The remaining light is transmitted through the objective lens 102. Since the eyepiece-side surface 102a is a concave surface, the image of the frames 110, 112 reflected at surface 102a is magnified when incident on the eyepiece lens 104. Further, the frames 110, 112 are superimposed on the image of the object that is viewed in the finder, allowing the photographer to see what portion of the image will be exposed on the film.

Thus as described above, an image of an object to be photographed is incident on the objective lens 102. For the portion of the object image incident on the partial reflection area 108, approximately half of the light is transmitted to the eyepiece lens 104. However, for the portion of the object image that is incident on an area between the partial reflection area 108 and the total reflection area 106, all of the light is transmitted to the eyepiece lens.

Therefore, a view field of the Albada finder 100 is brighter than that of the conventional Albada finder which has an entire eyepiece-side surface formed as a half-mirror.

Figure 5:
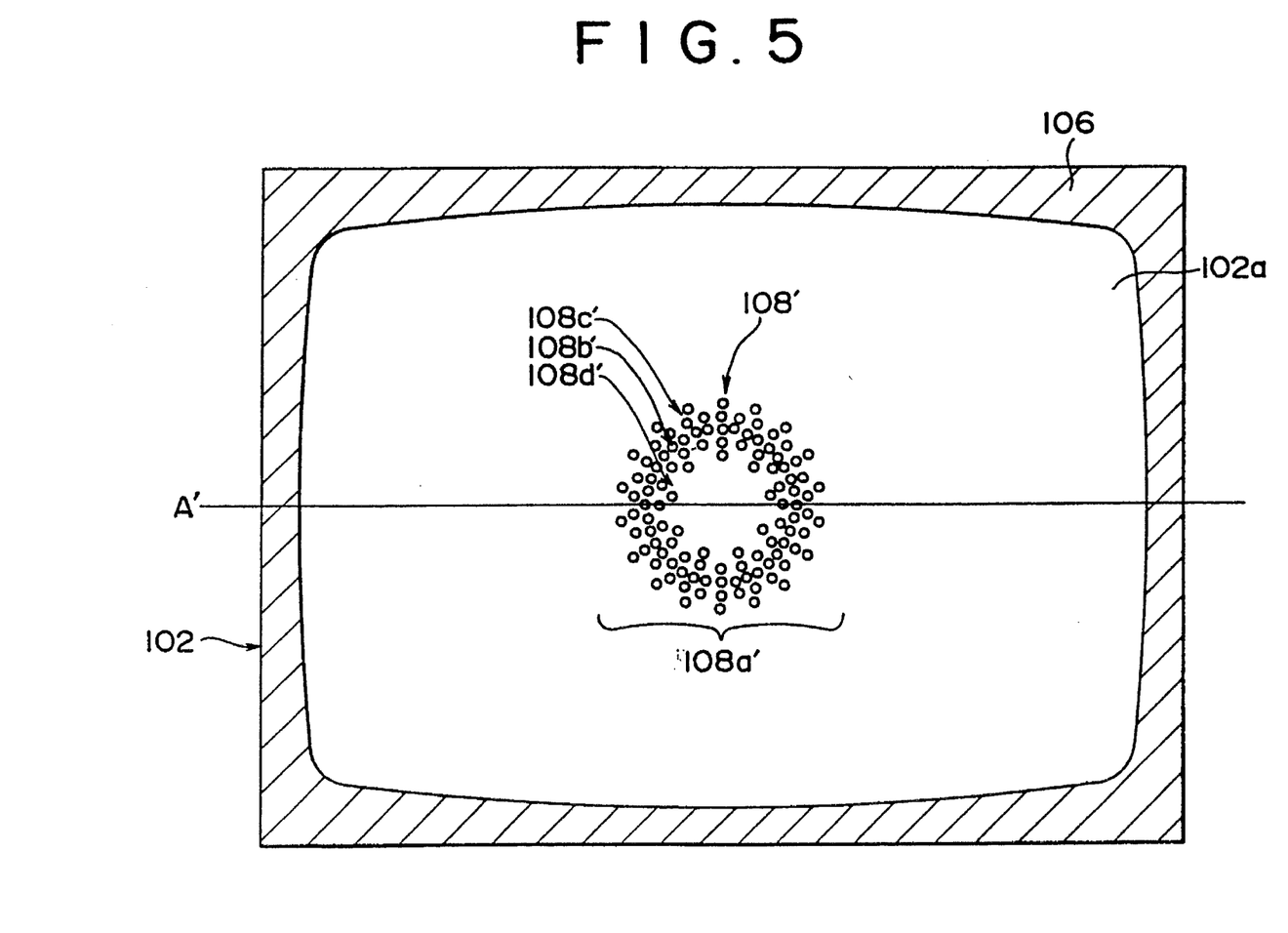
FIG. 5 is a plane view of an eyepiece-side surface of a negative objective lens showing a partial reflection area in accordance with a second embodiment of the present invention.

FIG. 5 shows an eyepiece-side surface 102a of a second embodiment of the present invention. A total reflection area 106 is formed around the periphery of the surface 102a in a manner similar to the first embodiment.

A partial reflection area 108' that is positioned in a central portion of the eyepiece-side surface 102a comprises a large number of circular dot mirrors 108a'. Further, the intermediate area between the total reflection area 106 and the partial reflection area 108' is a total transmission area, and is similar to the total transmission area shown in the first embodiment.

Reflectivity of the partial reflection area 108' is determined by the area ratio between the mirror portion and the total transmission portion.

Since each dot mirror 108a' has the same area in this embodiment, reflectivity of the partial reflection area 108' can be determined by density of the dot mirrors 108a'. Thus, each dot mirror 108a' is a total reflection mirror.

Figure 6:
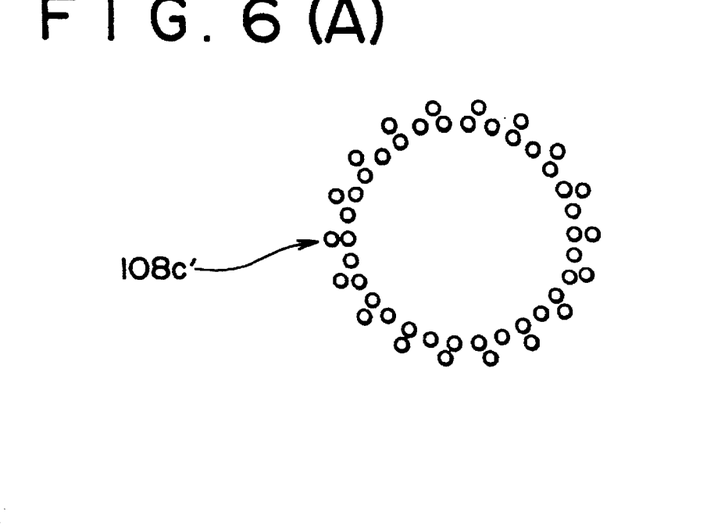
FIGS. 6(A), 6(B) and 6(C) each show a portion of the partial reflection area shown in FIG. 5.

An outer portion 108c' of the partial reflection area 108' is formed such that the density of the dot mirrors 108a' is reduced in the direction away from the center of the surface 102a, as shown in FIG. 6(A). An intermediate portion 108b' has the highest density of dot mirrors 108a', as shown in FIG. 6(B). Further, an inner portion 108d' is formed such that the density of the dot mirrors 108a' is reduced in the direction towards the center of the surface 102a, as shown in FIG. 6(C).

Therefore, in the portion 108c', the macroscopic reflectivity gradually decreases to 0% as the distance from portion 108b' increases. The macroscopic reflectivity in the portion 108b' remains a constant 50%. Further, the macroscopic reflectivity in the portion 108d' gradually decreases to 0% as the distance from the portion 108b' increases.

FIG. 5 shows the eyepiece-side surface 102a in a conceptual view. The number of dot mirrors 108a' in the actual embodiment is much larger than that shown in the drawings. Further, the radius of each dot mirror in the actual embodiment is much smaller than that shown.

Figure 7:
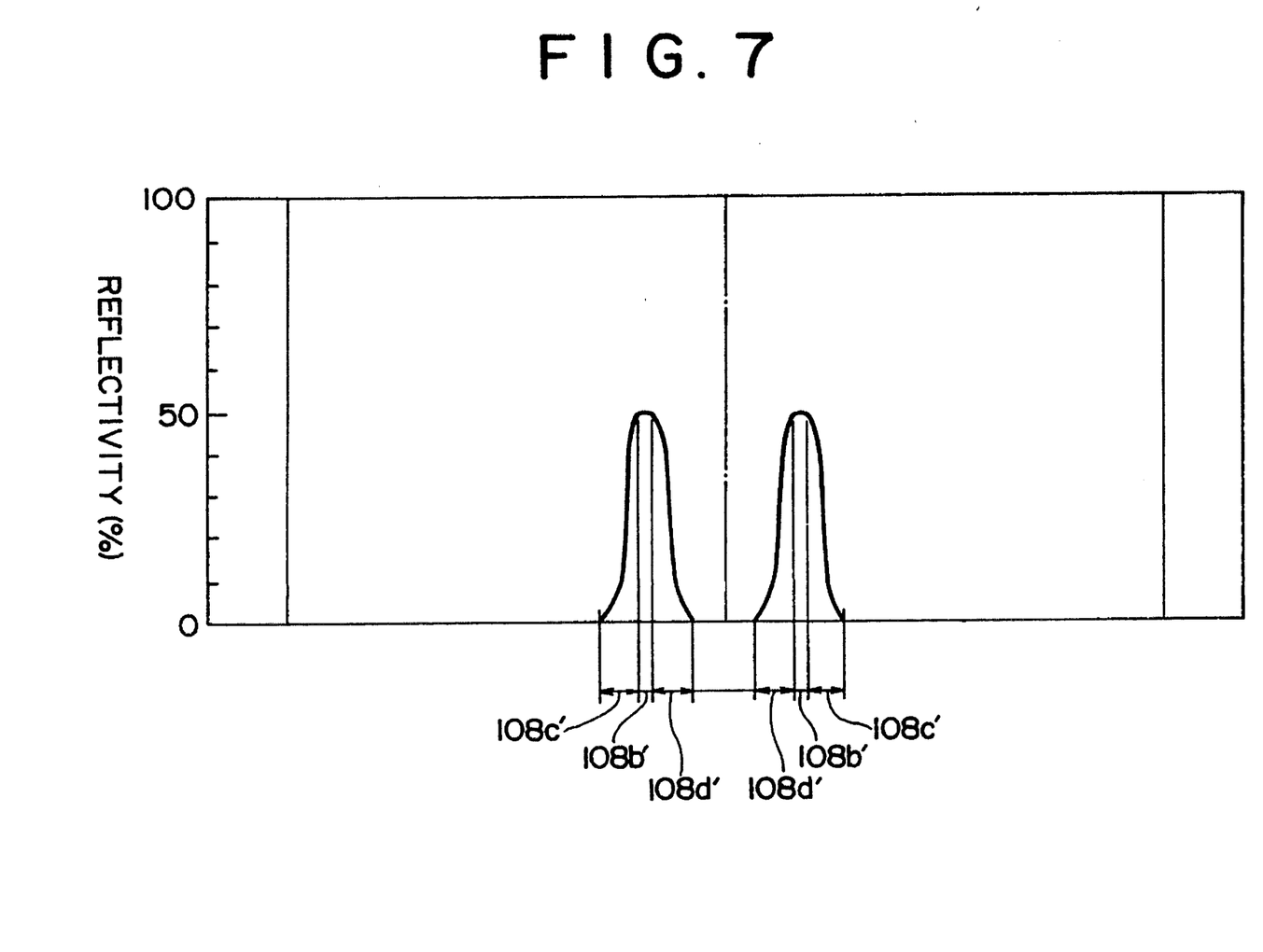
FIG. 7 is a graph showing reflectivity of the eyepiece-side surface of the negative objective lens shown in FIG. 5.

The macroscopic reflectivity of the partial reflection area 108 along a line A' in FIG. 5, is shown in FIG. 7.

The macroscopic reflectivity is determined from the density of the dot mirrors 108a', and the area of each dot mirror 108a'.

Since the objective-side surface 104b is formed as a flat surface in the above-mentioned embodiments, it is easy to form the image boundary frame 110 and the focusing frame 112. However, the form of the eyepiece lens 104 is not limited to the plano-convex lens. For example, a double convex lens or a positive meniscus lens can be used.

Moreover, the frames 110 and 112 can be formed on a plane plate independently mounted between the two lenses 102 and 104.

Further, the focusing frame 112 is an example of a secondary frame that may be formed inside the area enclosed by the image boundary frame 110. However, other frames such as a panoramic frame to define a frame area when using a panoramic photographing format, or marks, can also be formed.

The present disclosure relates to subject matter contained in Japanese utility model application No. H5-63646 (filed on Nov. 2, 1993) which is expressly incorporated herein by reference in its entirety.

What is claimed is:

1. An Albada finder having a negative objective lens and a positive eyepiece lens, said Albada finder comprising:

a frame formed inside an area of an object-side surface of said positive eyepiece lens; and a partial reflection area formed on an eyepiece-side surface of said negative objective lens, said partial reflection area reflecting an image of said frame, wherein said frame is formed to enclose a small area of said object-side surface of said eyepiece lens, wherein said partial reflection area is formed to enclose a small area of said eyepiece-side surface of said objective lens, and wherein substantially all of a remaining area of said eyepiece-side surface of said negative objective lens not enclosed by said partial reflection area fully transmits all light incident thereon.

2. The Albada finder of claim 1, wherein said partial reflection area comprises a plurality of ring mirrors that are concentrically arranged, each of said ring mirrors separated by a spacing.

3. The Albada finder of claim 2, wherein a reflectivity of said partial reflection area is determined by a ratio of a width $h_1$ of said ring mirrors and a width $h_2$ of said spacing between said ring mirrors.

4. The Albada finder of claim 3, wherein said width $h_2$ of said spacing between said ring mirrors is the same for each pair of said ring mirrors, and wherein said reflectivity is set by changing said width $h_1$ of said ring mirrors.

5. The Albada finder of claim 4, wherein said partial reflection area comprises:

an intermediate portion having a constant reflectivity;

an inner portion positioned between a center of said eyepiece-side surface and said intermediate portion; and an outer portion positioned between said intermediate portion and a periphery of said eyepiece-side surface, wherein reflectivities of said inner and outer portions gradually decrease as a distance from said intermediate portion increases.

6. The Albada finder of claim 5, wherein said reflectivity of said intermediate portion is 50%, and wherein said reflectivities of said inner and outer portions gradually reduce from 50% to 0% as said distance from said intermediate portion increases.

7. The Albada finder of claim 1, wherein said partial reflection area comprises a plurality of dot mirrors.

8. The Albada finder of claim 7, wherein the reflectivity of said partial reflection area is determined by a density of said dot mirrors.

9. The Albada finder of claim 8, wherein each dot mirror has a same area, and wherein said reflectivity of said partial reflection area is determined by a number of said dot mirrors per unit area.

10. The Albada finder of claim 9, wherein said partial reflection area comprises:

an intermediate portion having a constant reflectivity;

an inner portion positioned between a center of said eyepiece-side surface and said intermediate portion; and an outer portion positioned between said intermediate portion and a periphery of said eyepiece-side surface, wherein reflectivities of said inner and outer portions gradually decrease as a distance from said intermediate portion increases.

11. The Albada finder of claim 10, wherein said reflectivity of said intermediate portion is 50%, and wherein said reflectivities of said inner and outer portions gradually reduce from 50% to 0% as said distance from said intermediate portion increases.

12. The Albada finder of claim 1, wherein said partial reflection area comprises:

an intermediate portion having a constant reflectivity;

an inner portion positioned between a center of said eyepiece-side surface and said intermediate portion; and an outer portion positioned between said intermediate portion and a periphery of said eyepiece-side surface, wherein reflectivities of said inner and outer portions gradually decrease as a distance from said intermediate portion increases.

13. The Albada finder of claim 12, wherein said reflectivity of said intermediate portion is 50%, and wherein said reflectivities of said inner and outer portions gradually reduce from 50% to 0% as said distance from said intermediate portion increases.

14. The Albada finder of claim 1, wherein said inside frame is a focusing frame which indicates a detecting area of an auto-focus device of a camera using said Albada finder.

15. The Albada finder of claim 1, wherein said positive eyepiece lens is provided with another frame on said object-side surface, wherein said another frame surrounds said frame, wherein a total reflection area is formed on said remaining area of said eyepiece-side surface of said negative objective lens, said total reflection area surrounding said partial reflection area, wherein said total reflection area reflects an image of said another frame, towards said object-side surface, and wherein an area of an object image inside said another frame corresponds to a portion of said object image that will be exposed onto a film of a camera using said Albada finder.

16. An Albada finder having a negative objective lens, a positive eyepiece lens, an image boundary frame formed on an object-side surface of said eyepiece lens, and a total reflection area formed on an eyepiece-side surface of said objective lens for reflecting an image of said image boundary frame back to said eyepiece, said Albada finder further comprising:

a focusing frame formed inside an area of said object-side surface of said positive eyepiece lens enclosed by said image boundary frame; and a partial reflection area formed inside an area of said eyepiece-side surface of said negative objective lens enclosed by said total reflection area, said partial reflection area reflecting an image of said focusing frame, wherein an area of said eyepiece-side surface of said negative objective lens between said total reflection area and said partial reflection area, fully transmits all light incident thereon.

17. The Albada finder of claim 16, wherein said partial reflection area comprises:

an intermediate portion having a constant reflectivity;

an inner portion positioned between a center of said eyepiece-side surface and said intermediate portion; and an outer portion positioned between said intermediate portion and a periphery of said eyepiece-side surface, wherein reflectivities of said inner and outer portions gradually decrease as a distance from said intermediate portion increases.

18. The Albada finder of claim 17, wherein said reflectivity of said intermediate portion is 50%, and wherein said reflectivities of said inner and outer portions gradually reduce from 50% to 0% as said distance from said intermediate portion increases.

19. The Albada finder of claim 16, wherein said focusing frame indicates a detecting area of an auto-focus device of a camera using said Albada finder.

* * * * *